United States Patent
Yang et al.

(10) Patent No.: US 7,216,172 B2
(45) Date of Patent: May 8, 2007

(54) SYSTEMS AND METHODS FOR ESTABLISHING QUASI-PERSISTENT HTTP CONNECTIONS

(75) Inventors: Guanghong Yang, San Jose, CA (US); Christopher Martin, San Jose, CA (US)

(73) Assignee: Webex Communications, Inc., Santa Clara, CA (US)

( * ) Notice: Subject to any disclaimer, the term of this patent is extended or adjusted under 35 U.S.C. 154(b) by 687 days.

(21) Appl. No.: 09/963,216

(22) Filed: Sep. 25, 2001

(65) Prior Publication Data

US 2003/0061355 A1    Mar. 27, 2003

(51) Int. Cl.
*G06F 15/16* (2006.01)
*G06F 15/173* (2006.01)

(52) U.S. Cl. .................. 709/227; 709/203; 709/225; 709/228

(58) Field of Classification Search .............. 709/227, 709/203, 225, 228
See application file for complete search history.

(56) References Cited

U.S. PATENT DOCUMENTS

| | | | | |
|---|---|---|---|---|
| 6,092,078 | A * | 7/2000 | Adolfsson | 707/102 |
| 6,205,415 | B1 * | 3/2001 | Butts et al. | 703/27 |
| 6,212,565 | B1 * | 4/2001 | Gupta | 709/229 |
| 6,233,543 | B1 * | 5/2001 | Butts et al. | 703/27 |
| 6,308,222 | B1 * | 10/2001 | Krueger et al. | 709/247 |
| 6,341,312 | B1 * | 1/2002 | French et al. | 709/227 |
| 6,412,009 | B1 * | 6/2002 | Erickson et al. | 709/228 |
| 6,594,707 | B1 * | 7/2003 | Rubinstein et al. | 709/250 |
| 6,789,119 | B1 * | 9/2004 | Zhu et al. | 709/227 |
| 6,829,638 | B1 * | 12/2004 | McBrearty et al. | 709/219 |
| 6,892,240 | B1 * | 5/2005 | Nakajima | 709/227 |
| 6,970,933 | B1 * | 11/2005 | Masters | 709/229 |
| 2003/0028647 | A1 * | 2/2003 | Grosu | 709/227 |
| 2003/0208600 | A1 * | 11/2003 | Cousins | 709/227 |

OTHER PUBLICATIONS

U.S. Appl. No. 09/751,806, filed Dec. 29, 2000, Zhu et al.

* cited by examiner

*Primary Examiner*—Bunjob Jaroenchonwanit
*Assistant Examiner*—Ramsey Refai
(74) *Attorney, Agent, or Firm*—Orrick, Herrington & Sutcliffe LLP

(57) ABSTRACT

The present invention provides systems and methods that allow one or more quasi-persistent HTTP connections to be established between a client computer and server computer. The quasi-persistent HTTP connection(s) allow(s) data to be transferred between the client computer and the server computer without having to repeatedly set up and then terminate a HTTP connection between the client computer and the server computer each time the client computer and the server computer have data to send to one another. Two or more quasi-persistent HTTP connections can be established between a client computer and a server computer to form a bi-directional connection between the client computer and the server computer. The bi-directional connection significantly improves the speed and the efficiency of data transfer between the client computer and the server computer.

7 Claims, 4 Drawing Sheets

SYSTEMS AND METHODS FOR ESTABLISHING QUASI-PERSISTENT HTTP CONNECTIONS

BACKGROUND OF THE INVENTION

1. Field of the Invention

The present invention relates to communications over computer networks and more particularly to systems and methods for establishing quasi-persistent HTTP connections over a computer network.

2. Related Art

Hyper-text transfer protocol (HTTP) is a well-known application layer protocol that typically operates on top of Transmission Control Protocol (TCP), which is a well-known transport layer protocol. HTTP allows client computers to communicate with server computers over a computer network. As used herein, the terms client (or client computer) and server (or server computer) are relative. A client is an entity that is making a request to a server which typically responds to the client's request. Thus any computer may act as both a client and a server.

Today, version 1.0 of the HTTP protocol (HTTP 1.0) is the most widely used HTTP protocol. HTTP 1.0 is based on a request-response paradigm. The request-response paradigm can be characterized by four-stages: connection, client request, server response, and connection termination. HTTP is a stateless protocol since it does not maintain a connection after the four-stage process has taken place.

In the connection stage, a client attempts to connect to a port on the server. Typically, port 80 on the server is used for HTTP connections. If a connection is established, the server sends a response to the client that indicates that a connection has been established. In the client request stage, the client generates a HTTP request. Common HTTP requests include GET requests and POST requests. A GET request requests the server to send data (e.g., a web page or any other type of data) to the client. A POST request allows the client to send data (e.g., a HTML form or any other type of data) to the server. A POST request may, for example, cause the server to execute an external application or a CGI script to handle the data being posted by a HTML form. In the server response stage, the server generates a HTTP response. The response will differ depending on the type of HTTP request that was received from the client. In the connection termination stage, the connection between the server and the client is terminated.

The four-stage connection, client request, server response, connection termination process occurs each time a client has new data to request from the server or send to the server using HTTP 1.0. As a result, communications using HTTP 1.0 can be very slow since a new connection is established and then terminated each time a client generates a new request. This is especially true in situations where HTTP 1.0 is being used to transfer data in real-time between client and server computer such as during a data conference. Consequently, the delays caused by repeatedly performing the four-stage process impose a serious limitation to real-time data transfers using HTTP 1.0.

One technique that has been developed to address this limitation places a "Keep-Alive" header within a response or a request. The Keep-Alive header, which is not defined by HTTP 1.0, indicates that the connection should not be terminated until the client or the server decides to terminate the connection. The client and server can then send data between one another without having to perform the time consuming four-stage process.

Although the Keep-Alive technique provides a persistent connection, there are several problems associated with the Keep-Alive technique. First, many clients and servers do not support the Keep-Alive technique. As such, there is no guarantee that the Keep-Alive technique will work with clients and servers that exist today. Second, the Keep-Alive technique can be unstable. For example, Keep-Alive connections between a client and a server can be unexpectedly terminated. Third, clients and servers are often separated from outside networks by firewalls that prevent Keep-Alive connections from being established or unexpectedly close the Keep-Alive connections after they are established. The firewalls may be implemented on proxy servers that act as an interface between clients and servers and external computer networks such as the Internet.

Accordingly, what is needed are systems and methods for creating quasi-persistent HTTP connections that overcome the limitations described above.

SUMMARY OF THE INVENTION

The present invention provides systems and methods for creating a quasi-persistent HTTP connections that overcome the limitations described above. This is accomplished by modifying the content-length key-value pair in a HTTP request or response. In particular, a computer program running on the server or client modifies the content-length key-value pair so that the content-length key-value pair has a content-length value that is large. By generating a content-length value that is large, the time that the HTTP connection remains open can be controlled and thus increased. The client or server that receives the content-length key-value pair having the large content-length value, in effect, believes that a large amount of data will be included with the request or response when, in fact, there may be little or no data to actually transfer at that point in time. As such, a quasi-persistent HTTP connection can be established between the client and the server and the length of time the quasi-persistent HTTP connection remains open can be controlled via the content-length value. This is advantageous since the quasi-persistent HTTP connection can be used to transfer data between the client and the server without having to set up a new HTTP connection each time new data needs to be sent to between the client and the server.

In some embodiments, a bi-directional quasi-persistent HTTP connection can be established between a client computer and a server computer. The bi-directional connection significantly improves the speed and the efficiency of data transfers between the client computer and the server computer. The bi-directional connection is especially useful when data needs to be transferred between the client computer and the server computer in real-time, such as during a data conference.

Other embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings, in which.

DETAILED DESCRIPTION OF THE INVENTION

Figure 1:
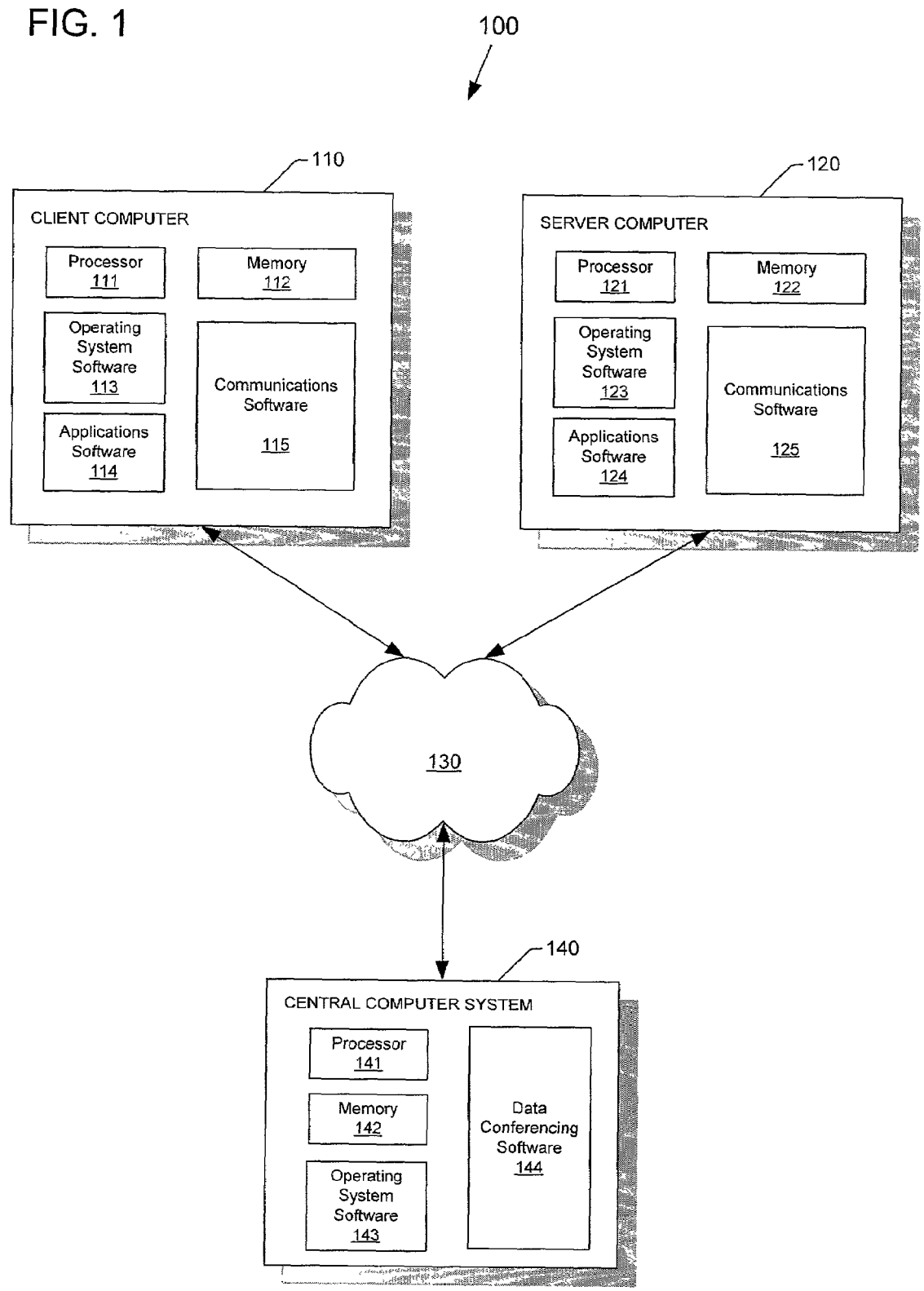
FIG. 1 is a block diagram of an exemplary computer system, according to some embodiments of the present invention.

The preferred embodiments of the present invention and their advantages are best understood by referring to FIGS. 1 through 4 of the drawings. Like reference numerals are used for like and corresponding components of the various drawings.

System Overview

FIG. 1 is a block diagram of an exemplary computer system 100, according to some embodiments of the present invention. Computer system 100 is one environment in which the present invention can operate. A client computer 110 is connected to a server computer 120 via a global area computer network 130. Additionally, a proxy server (not shown) may be located between client computer 110 and global area network 130, and a proxy server (not shown) may be located between server computer 120 and the global area network 130. A proxy server can be a HTTP proxy server that can perform multiple functions. For example, a proxy server may act as a firewall.

Client computer 110 can be any type of electronic device that is capable of establishing a connection with server computer 120 and exchanging data such as a desktop computer, a laptop computer, a personal digital assistant (PDA), or a cellular telephone. In the embodiment shown in FIG. 1, client computer 110 includes processor 111, memory 112, operating system software 113, applications software 114, and communications software 115. Processor 111 can be any suitable processor, such as a member of the Pentium family of processors. Memory 112 can be any type of suitable memory, such as DRAM, SRAM, a magnetic hard drive, an optical hard drive, or any combination thereof. Operating system software 113 can be any type of suitable operating system software, such as a version of Windows (e.g., Windows 95, 98, NT, ME, 2000, or XP), a version of UNIX (e.g., Solaris or Linux), the Macintosh OS, IBM mainframe OS/390, or the AS/400's OS/400. Applications software 124 can be a word processing application, a spreadsheet application, a computer-aided drafting application, or any other type of application.

Communications software 115 can be any type of suitable software that enables client computer 110 to exchange data with server computer 120. As described in detail below, communications software 115 includes computer instructions that can modify the content-length value of the content-length key-value pair associated with a HTTP request (e.g., a POST request) or a response to a HTTP request (e.g., a response to a GET request). Communications software 115 can make the content-length value any value and thus create a quasi-persistent HTTP connection that remains open for a predetermined amount of time.

Client computer 110 may also include data conferencing software (not shown). Data conferencing software enables users to share applications or other data on their computers in a data conference. In some embodiments, communications software 115 is included within the data conferencing software. In some embodiments, the data conferencing software is a plug-in that can be downloaded over the Internet.

Server computer 120 can be any type of electronic device that is capable of establishing a connection with client computer 110 and exchanging data such as a desktop computer, a laptop computer, a personal digital assistant (PDA), or a cellular telephone. In the embodiment shown in FIG. 1, server computer 120 includes processor 121, memory 122, operating system software 123, applications software 124, and communications software 125. Processor 121 can be any suitable processor, such as a member of the Pentium family of processors. Memory 122 can be any type of suitable memory, such as DRAM, SRAM, a magnetic hard drive, an optical hard drive, or any combination thereof. Operating system software 123 can be any type of suitable operating system software, such as a version of Windows (e.g., Windows 95, 98, NT, ME, 2000, or XP), a version of UNIX (e.g., Solaris or Linux), the Macintosh OS, IBM mainframe OS/390, or the AS/400's OS/400. Applications software 124 can be a word processing application, a spreadsheet application, a computer-aided drafting application, or any other type of application.

Communications software 125 can be any type of suitable software that enables server computer 120 to exchange data with client computer 110. As described in detail below, communications software 125 includes computer instructions that can modify the content-length value of the content-length key-value pair associated with a HTTP request (e.g., a POST request) or a response to a HTTP request (e.g., a response to a GET request). Communications software 125 can make the content-length value any value and thus create a quasi-persistent HTTP connection that remains open for a predetermined amount of time. In some embodiments, communications software 125 that runs on server computer 120 is identical to communications software 115 that runs on client computer 110.

Server computer 120 may also include data conferencing software (not shown). As mentioned above, data conferencing software enables users to share applications or other data on their computers in a data conference. In some embodiments, communications software 125 is included within the data conferencing software. In some embodiments, the data conferencing software is a plug-in that can be downloaded over the Internet.

Global area computer network 130 can be any type of computer network that includes numerous computers that communicate with one another. In some embodiments, global area computer network 130 is the Internet.

Computer system 100 also includes a central computer system 140. Central computer system 140 includes processor 141, memory 142, operating system software 143, and data conferencing software 144. Processor 141 can be any suitable processor, such as a member of the Pentium family of processors. Memory 142 can be any type of suitable memory, such as DRAM, SRAM, a magnetic hard drive, an optical hard drive, or any combination thereof. Operating system software 143 can be any type of suitable operating system software, such as a version of Windows (e.g., Windows 95, 98, NT, ME, 2000, or XP), a version of UNIX (e.g., Solaris or Linux), the Macintosh OS, IBM mainframe OS/390, or the AS/400's OS/400.

Although central computer system 140 is depicted as a single computer, central computer system 140 can include numerous computers that perform different functions. Central computer system 140 may be operated by a service provider and provide a website that allows a user operating client computer 110 to share applications or other data with a user operating server computer 120 during a data conference. An example of a service provider is WebEx Communications, Inc. of San Jose, Calif.

As described in greater detail below, the present invention allows one or more quasi-persistent HTTP connections to be established between client computer 110 and server computer 120. The quasi-persistent HTTP connection(s) allow(s) data to be transferred between client computer 110 and server computer 120 without having to repeatedly set up and then terminate a HTTP connection between client computer 110 and server computer 120 each time client computer 110 and server computer 120 have data to send to one another.

In some embodiments, the quasi-persistent HTTP connections are established between client computer 110 and server computer directly through global area computer network 130. For example, a connection may originate at client computer 110, pass through global area network 130, and then end at server computer 120. In other embodiments, the quasi-persistent HTTP connections are established between client computer 110 and server computer through global area computer network 130 and central computer system 130. For example, a connection may originate at client computer 110, pass through global area network 130, enter central computer system 140, exit central computer system 140, pass through global area network 130, and then end at server computer 120.

Quasi-Persistent HTTP Connection Based on a GET Request

Figure 2:
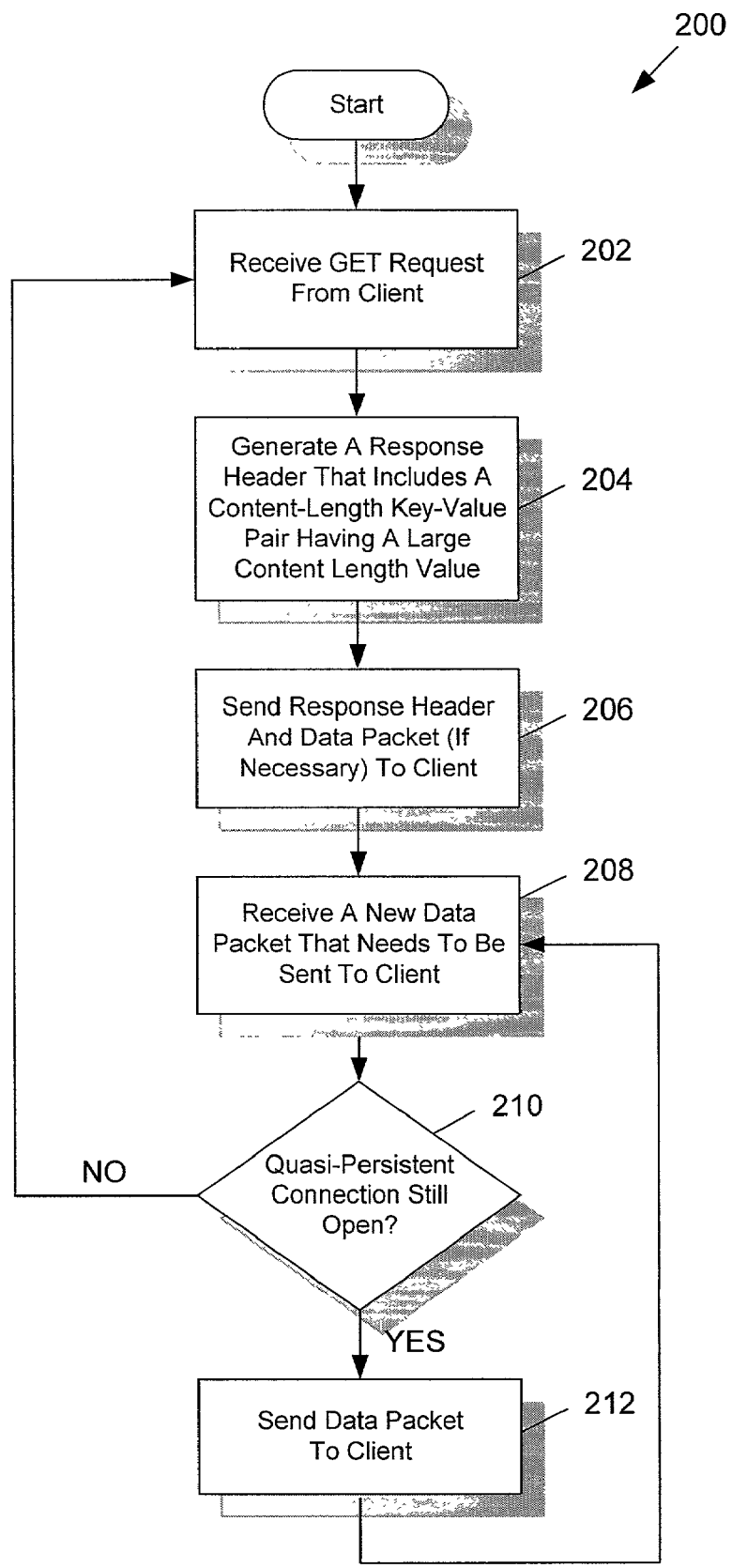
FIG. 2 is a flowchart of an exemplary method for establishing a quasi-persistent HTTP connection, according to some embodiments of the present invention. The method described with reference to FIG. 2 describes how a quasi-persistent HTTP connection can be established based on a HTTP GET request sent by a client to a server.

FIG. 2 is a flowchart of an exemplary method 200 for establishing a quasi-persistent HTTP connection, according to some embodiments of the present invention. Method 200 describes how a quasi-persistent HTTP connection can be established based on a HTTP GET request sent by client computer 110 to server computer 120. Method 200 is described with reference to computer system 100 of FIG. 1.

In step 202, server computer 120 receives a GET request from client computer 110. Prior to step 202, client computer 110 establishes a connection, such as a TCP connection, with server computer 120. Client computer 110 then sends the GET request to server computer 120 and server computer 120 receives the GET request from client computer 110.

In step 204, server computer 120 generates a response header that includes a content-length key-value pair having a large content-length value. The format of the response header includes the following components: an initial line, one or more header lines, and a message body.

The initial line for a GET request includes three parts: the GET method name, a URI that identifies the local path of the requested data or resource, and the version of HTTP being used.

The one or more header lines include one or more headers. Headers provide information about the request or about the object sent in the message body. Each header is formatted as a key-value pair. The key and value are separated from one another by a colon and space. Each header is placed on a new line in the response. Typical headers include content-type, content-length, server, last modified, date, location, and MIME-version.

The message body includes data. In a response to a GET request, the message body is where the requested data or resource is returned to the client. The GET request usually includes information that describes the message body, such as the content-type key-value pair and the content-length key-value pair. The content-type key-value pair gives the MIME-type of the data in the body, such as text/html or image/gif, and the content-length key-value pair includes a content-length value that gives the number of bytes in the body. The HTTP 1.0 protocol requires a valid content-length field be included with all messages containing a message body.

The content-length key-value pair in the response header is particularly important to the present invention. According to the present invention, communications software 125 on server computer 120 generates a content-length value that is large enough to cause the connection between client computer 110 and server computer 120 to be maintained for a relatively long period of time. In other words, the content-length value is large enough so that a quasi-persistent HTTP connection is established between client computer 110 and server computer 120. By generating a content-length value that is large in the response to the GET request, client computer 110 thinks that server computer 120 has a large amount of data to send to client computer 110 in response to the GET request sent by client computer 110. However, server computer 120 generates a response with a large content-length value regardless of the amount of data that server computer 120 currently has to send to client computer 110. Server computer 120 can then send data to client computer 110 using the quasi-persistent HTTP connection when server computer 120 has new data to send to client computer 110. Note that since the content-length value can be selected to be any number of bytes, the amount of time that that quasi-persistent HTTP connection remains open can be controlled using the present invention.

The content-length value can be any predetermined number. However, the content-length value should be large enough to establish a connection between server computer 120 and client computer 1 10 for a relatively long period of time. If the content-length value is too small, the performance of the system will be degraded since the system will operate much like the conventional system described above (i.e., the four-stage connection, client request, server response, connection termination process will be performed repeatedly). In some embodiments, the content-length value is 256 Kbytes. Those skilled in the art will recognize, however, that the content-length value can be any value that is large enough to establish a connection between client computer 110 and server computer 120 for a relatively long period of time.

In step 206, server computer 120 sends the response header to client computer 110. The response header includes the content-length field having the large content-length value. Server computer 120 can also send data to client computer 110 in the message body of the response to the GET request.

In step 208, server computer 120 receives a new data packet that needs to be sent to client computer 110. The new data packet can be any type of data that server computer 120 needs to send to client computer 110.

In step 210, server computer 120 determines whether the quasi-persistent HTTP connection is still open. The quasi-persistent HTTP connection, as its name implies, is terminated or closed at some point in time. This point in time is defined by the content-length value that server computer 120 included within the response (step 204). However, as long as the quasi-persistent HTTP connection between client computer 110 and server computer 120 exists, any new data that server computer 120 needs to send to client computer 110 can be sent over the quasi-persistent HTTP connection. It is important to note that this significantly increases the speed at which client computer 110 and server computer 120 can communicate with one another since a new HTTP connection does not have to be established each time new data needs to be transferred from server computer 120 to client computer 110.

In step 212, server computer 120 send the data packet to client computer 110 via the quasi-persistent HTTP connection. The data packets can be sent from server computer 120 to client computer 110 using any suitable transport protocol. After step 212 is performed, method 200 returns to step 208. New data packets can then be sent from server computer 120 to client computer 110 as long as the quasi-persistent HTTP connection remains open.

In some cases, method 200 may have to be modified to maintain a quasi-persistent HTTP connection between server computer 120 and client computer 110. For example, server computer 120 may have to generate and send heartbeat data packets to client computer 110 to maintain the quasi-persistent HTTP connection. This is because some HTTP proxy servers monitor the message body to make sure that there is activity within the message body (i.e., that data is being sent within message body). If there is no activity within the message body, the HTTP proxy servers terminate the connection. The heartbeat data packets can be generated and sent within message body often enough so that the persistent connection will be maintained. As another example, the total number of data packets sent within the message body may be monitored and, if necessary, pad data packets can be included in the message body data to make the HTTP request a valid HTTP request according to the HTTP protocol. Other modifications can be made to method 200, all of which are within the scope of the present invention.

It is important to note that method 200 may not work with some HTTP proxy servers. This is because some HTTP proxy servers wait until all of the data defined by the content-length key-value pair in the response to the GET request is received from server computer 120 before forwarding the data to client computer 110. In these cases, method 200 can be modified to automatically detect whether method 200 will work with a particular HTTP proxy server. In particular, server computer 120 can generate a test request containing test data packets. Server computer 120 can then watch to see if the proxy server receives all of the test data packets before sending them to client computer 110, or if the proxy server forwards each test data packet to client computer 110 at the time each test data packet is received from server computer 120. If the proxy server receives all of the test data packets before sending them to client computer 110, server computer 120 knows that it must communicate with client computer 110 using conventional techniques. If the proxy server forwards each test data packet to client computer 110 at the time each test data packet is received from server computer 120, server computer 120 knows that it can communicate with client computer 120 using method 200.

Method 200 also operates well in conjunction with Secure Sockets Layer (SSL), the well-known security protocol used on the Internet. If SSL is used, a HTTP proxy server generally has very little control over HTTP requests and responses. This is because the HTTP requests and responses are encrypted and the HTTP proxy server does not have the encryption key information that is needed to decrypt the underlying data. As a result, the HTTP proxy server blindly forwards the data to the client or server. Thus quasi-persistent HTTP connections of the present invention, when used with SSL or any other encryption techniques, are generally transparent to HTTP proxy servers.

Quasi-Persistent HTTP Connection Based on a POST Request

Figure 3:
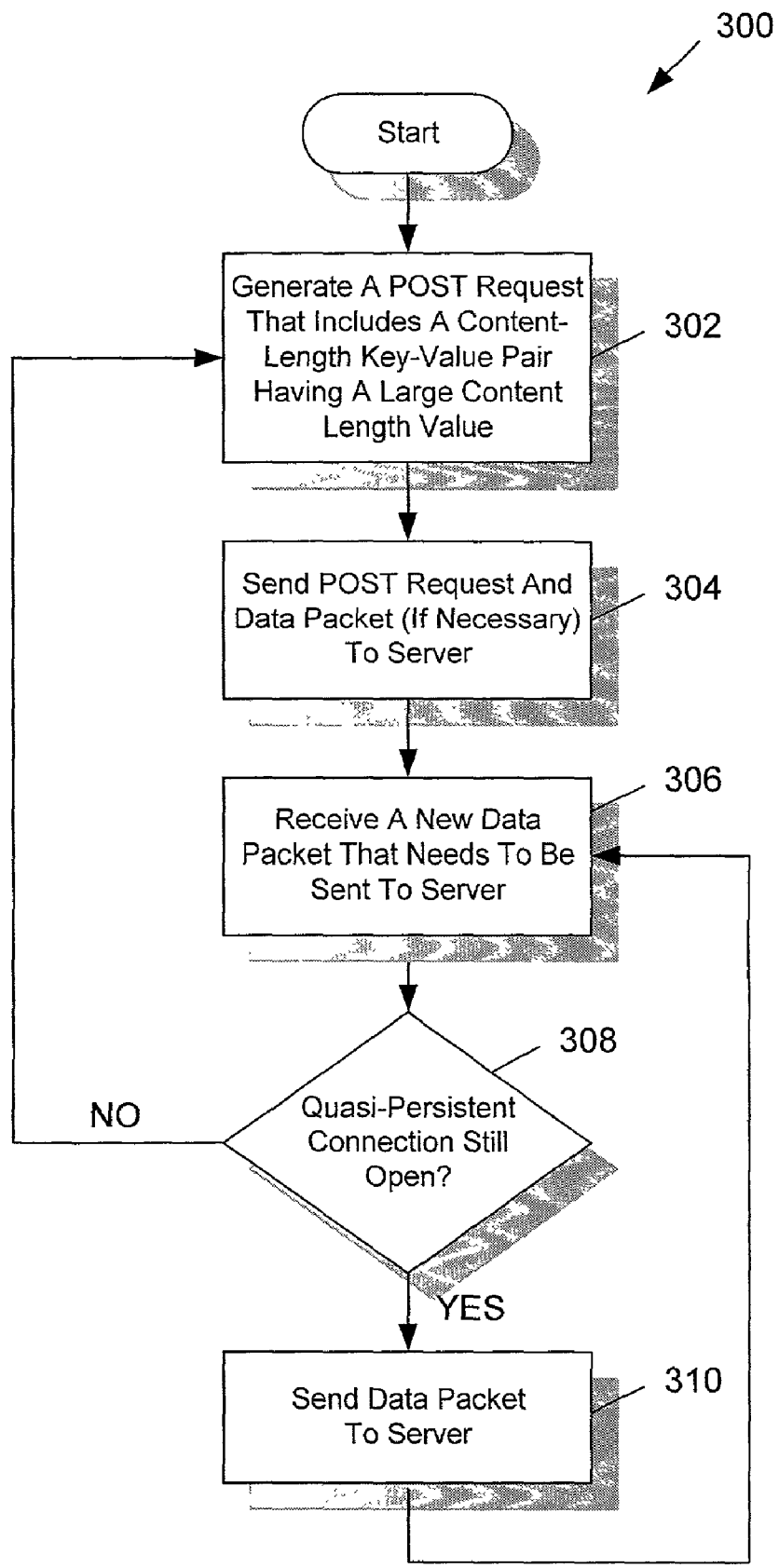
FIG. 3 is a flowchart of an exemplary method for establishing a quasi-persistent HTTP connection, according to some embodiments of the present invention. The method described with reference to FIG. 3 describes how a quasi-persistent HTTP connection can be established based on a HTTP POST request sent by a client to a server.

FIG. 3 is a flowchart of an exemplary method 300 for establishing a quasi-persistent HTTP connection, according to some embodiments of the present invention. Method 300 describes how a quasi-persistent HTTP connection can be established based on a HTTP POST request sent by client computer 110 to server computer 120. Method 300 is described with reference to computer system 100 of FIG. 1.

In step 302, client computer 110 generates a POST request that includes a content-length key-value pair having a large content-length value. The format of a POST request is similar to the format of a GET request (discussed above) and includes the following components: an initial line, one or more header lines, and a message body.

The initial line for a POST request includes three parts: the POST method name, a URI that may identify a program to handle the data sent with the post request, and, and the version of HTTP being used.

The one or more header lines can include one or more headers. As described above, headers provide information about the request or about the object sent in the message body. Each header is formatted as a key-value pair. The key and value are separated from one another by a colon and space. Each header is placed on a new line in the response. Typical headers include content-type, content-length, server, last modified, date, location, and MIME-version.

The message body includes data. In a POST request, the message body is where data or a resource is sent to the server. The POST request usually includes information that describes the message body, such as the content-type key-value pair and the content-length key-value pair. The content-type key-value pair gives the MIME-type of the data in the body, such as text/html or image/gif, and the content-length key-value pair includes a content-length value that gives the number of bytes in the body. The HTTP 1.0 protocol requires a valid content-length field be included with all messages containing a message body.

The content-length key-value pair included in the POST request is particularly important to the present invention. According to the present invention, communications software 115 on client computer 110 generates a content-length value that is large enough to cause the connection between client computer 110 and server computer 120 to be maintained for a relatively long period of time. In other words, the content-length value is large enough so that a quasi-persistent HTTP connection is established between client computer 110 and server computer 120. By generating a content-length value that is large in the POST request, server computer 120 thinks that client computer 110 has a large amount of data to send to server computer 120 in the POST request sent by client computer 110. However, client computer 110 generates a POST request with a large content-length value regardless of the amount of data that client computer 110 currently has to send to server computer 120. Client computer 110 can then send data to server computer 120 using the quasi-persistent HTTP connection when client computer 110 has new data to send to server computer 120. Note that since the content-length value can be selected to be any number of bytes, the amount of time that that quasi-persistent HTTP connection remains open can be controlled using the present invention.

The content-length value can be any predetermined number. However, the content-length value should be large enough to establish a connection between client computer 110 and server computer 120 for a relatively long period of time. If the content-length value is too small, the performance of the system will be degraded since the system will operate much like the conventional system described above (i.e., the four-stage connection, client request, server response, connection termination process will continually be performed). In some embodiments, the content-length value is 256 Kbytes. Those skilled in the art will recognize, however, that the content-length value can be any value that is large enough to establish a connection between client computer 110 and server computer 120 for a relatively long period of time.

In step 304, client computer 110 sends the POST request to server computer 120. The response header includes the content-length field having the large content-length value. Client computer 110 can also send data to server computer 120 in the message body of the POST request.

In step 306, client computer 110 receives a new data packet that needs to be sent to server computer 120. The new data packet can be any type of data that client computer 110 needs to send to server computer 120.

In step 308, client computer 110 determines whether the quasi-persistent HTTP connection is still open. The quasi-persistent HTTP connection, as its name implies, is terminated or closed at some point in time. This point in time is defined by the content-length value that client computer 110 included within the POST request (step 302). However, as long as the quasi-persistent HTTP connection between client computer 110 and server computer 120 exists, any new data that client computer 110 needs to send to server computer 120 can be sent over the quasi-persistent HTTP connection. It is important to note that this significantly increases the speed at which client computer 110 and server computer 120 can communicate with one another since a new HTTP connection does not have to be established each time new data needs to be transferred from client computer 110 to server computer 120.

In step 310, client computer 110 sends the data packet to server 110 via the quasi-persistent HTTP connection. The data packets can be sent from client computer 110 to server computer 120 using any suitable transport protocol. After step 310 is performed, method 300 returns to step 306. New data packets can then be sent from client computer 110 to server computer 120 as long as the quasi-persistent HTTP connection remains open.

In some cases, method 200 may have to be modified to maintain a quasi-persistent HTTP connection between client computer 110 and server computer 120. For example, client computer 110 may have to generate and send heartbeat data packets to server computer 120 to maintain the quasi-persistent HTTP connection. As described above, this is because some HTTP proxy servers monitor the message body to make sure that there is activity within the message body (i.e., that data is being sent within message body). If there is no activity within the message body, the HTTP proxy servers terminate the connection. The heartbeat data packets can be generated and sent within message body often enough so that the persistent connection will be maintained. As another example, the total number of data packets sent within the message body may be monitored and, if necessary, pad data packets can be included in the message body data to make the HTTP request a valid HTTP request according to the HTTP protocol. Other modifications may have to be made to method 300, all of which are within the scope of the present invention.

It is important to note that method 300 may not work with some HTTP proxy servers. This is because some HTTP proxy servers wait until all of the data defined by the content-length key-value pair in the POST request is received before forwarding the data to server 120. In these cases, method 300 can be modified to automatically detect whether method will work with a particular HTTP proxy server. In particular, client computer 110 can generate a test request containing test data packets. Client computer 110 can then watch to see if the proxy server receives all of the test data packets before sending them to server computer 120, or if the proxy server forwards each test data packet to server computer 120 at the time each test data packet is received from client computer 110. If the proxy server receives all of the test data packets before sending them to server computer 120, client computer 110 knows that it must communicate server computer 120 using conventional techniques. If the proxy server forwards each test data packet to server computer 120 at the time each test data packet is received from client computer 110, client computer 110 knows that it can communicate client computer 110 using method 300.

Method 300 also operates well in conjunction with Secure Sockets Layer (SSL), the well-known security protocol used on the Internet. If SSL is used, a HTTP proxy server generally has very little control over HTTP requests and responses. This is because the HTTP requests and responses are encrypted and the HTTP proxy server does not have the encryption key information that is needed to decrypt the underlying data. As a result, the HTTP proxy server blindly forwards the data to the client or server. Thus quasi-persistent HTTP connections of the present invention, when used with SSL or any other encryption techniques, are generally transparent to HTTP proxy servers.

Bi-Directional Quasi-Persistent HTTP Connection

Figure 4:
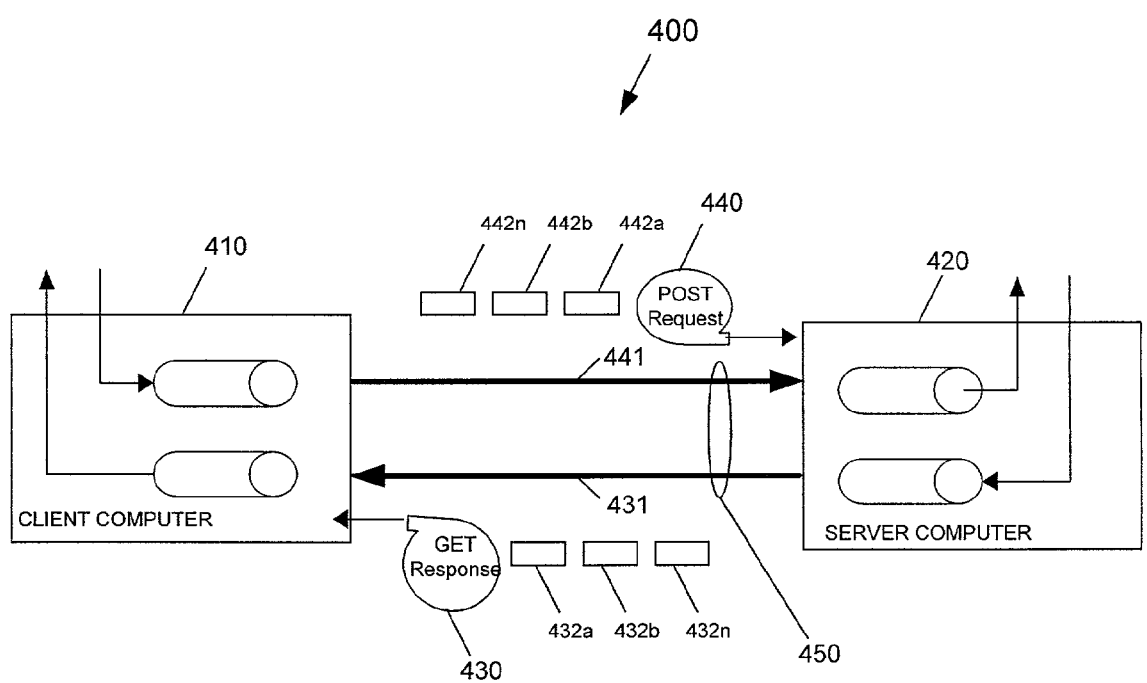
FIG. 4 is a block diagram of an exemplary computer system that utilizes a bi-directional quasi-persistent HTTP connection, according to some embodiments of the present invention.

FIG. 4 is a block diagram of an exemplary computer system 400 that utilizes a bi-directional quasi-persistent HTTP connection, according to some embodiments of the present invention. Computer system 400, which can be the same as computer system 100, includes a client computer 410 and a server computer 420. Client computer 410 and server computer 420 can be connected via a global area computer network (not shown). Additionally, a proxy server (not shown) may be located between client computer 410 and the global area network, and a proxy server (not shown) may be located between server computer 420 and the global area network. The proxy servers may perform multiple functions. For example, the proxy servers may act as a firewall.

A bi-directional quasi-persistent HTTP connection 450 can be established by creating two quasi-persistent HTTP connections 431 and 441. Quasi-persistent HTTP connection 431 can be used to transfer data from server computer 420 to client computer 410, and quasi-persistent HTTP connection 441 can be used to transfer data from client computer 410 to server computer 420.

Quasi-persistent HTTP connection 431 can be established by server computer 420 in two ways. First, as shown in FIG. 4, server computer 420 can establish quasi-persistent HTTP connection 431 by modifying the content-length value of a response 430 to a GET request sent by client computer 410 (as described in method 200 above). Second, server computer 420 can establish quasi-persistent HTTP connection 431 by modifying the content-length value of a POST request that will be sent to client computer 410 (as described in method 300 above). In both cases, quasi-persistent HTTP connection 431 allows server computer 420 to send data packets 432$n$ (where n=1, 2, 3, . . . , n) to client computer 410 as long as quasi-persistent HTTP connection 431 exists.

Similarly, quasi-persistent HTTP connection 441 can be established by client computer 410 in two ways. First, as shown in FIG. 4, client computer 410 can establish quasi-persistent HTTP connection 441 by modifying the content-length value of a POST request 440 that will be sent to server computer 420 (as described in method 300 above). Second, client computer 410 can establish quasi-persistent HTTP connection 441 by modifying the content-length value of a response to a GET request sent by server computer 420 (as described in method 200 above). In both cases, quasi-persistent HTTP connection 441 allows client computer 410 to send data packets 442$n$ (where n=1, 2, 3, . . . , n) to server computer 420 as long as quasi-persistent HTTP connection 441 exists.

Application of the Present Invention: Data Conference

The systems and method of the present invention are particularly useful in situations where data must be transferred from a client computer to a server computer and/or from a server computer to a client computer in real-time. One situation where client computer 410 and server computer 420 may be transferring data between one another in real-time is during a data conference.

During a data conference, computer users at different locations communicate via a computer network and share applications, files, or any other information that can be viewed, accessed, or used on one of the user's computers. Each user's computer includes a software program that enables the users to share applications and other data that resides on the users' computers. Users that share applications during a data conference are referred to herein as presenters. The computers used by presenters can, for example, be client computers. Users that receive the shared applications during a data conference are referred to herein as viewers. The computers used by viewers can, for example, be server computers. A data conference is described in co-pending and commonly-assigned U.S. patent application Ser. No. 09/751,806 entitled "Distributed Application Sharing," filed Dec. 29, 2000, which is herein incorporated by reference in its entirety.

Typically, users share applications during a data conference using HTTP connections. One of the shortcomings of using HTTP connections for data conferences is that it can take an unacceptable amount of time for a change made to an application or data residing on the presenter's computer to be communicated to the view's computer and visa versa. This is due to the time consuming the four-stage connection, client request, server response, connection termination process that must be performed each time new data transmitted between a presenter's computer and a viewer's computer (described above).

The present invention can be used to overcome this limitation. A bi-directional quasi-persistent HTTP connection, such as bi-directional quasi-persistent HTTP connection 450, can be established between the presenter's computer (e.g., the client) and the viewer's computer (e.g., the server). As the presenter makes changes to the application or other data on the presenter's computer, the changes are sent to the viewer's computer with minimal delay. Likewise, as the viewer makes changes to the application or other data on the viewer's computer, the changes are sent to the presenter's computer with minimal delay. This greatly enhances the presenter's and the viewer's experience during a data conference and thus makes data conferencing a more commercially valuable service.

Alternative Embodiments

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention. For example, the systems and methods of the present invention can be used to establish a connection between a client computer and a server computer using any type of stateless protocol, not just the HTTP protocol.

What is claimed is:

1. A method for generating a bi-directional communications link between a client and a server, the method comprising:
   testing an HTTP proxy server; to determine if the HTTP proxy server can communicate with said client using a quasi-persistent HTTP connection, by sending a test request comprising individual test data packets to the HTTP proxy server from said server;
   determining if the HTTP proxy server forwards each of said individual test data packets from the test request to the client upon receipt of each of said individual test data packets from the server; and
   if the HTTP proxy server does forward each of said individual data packets to the client upon receipt of each of said individual data packets, then generating at the server a response to a HTTP GET request having a first content-length value that is independent of the amount of data to be sent by the server in response to the HTTP GET request and large enough to establish a first quasi persistent HTTP connection between the client and the server via the HTTP proxy server; and
   receiving at the server a HTTP POST request having a second content-length value that is large enough to establish a second quasi-persistent HTTP connection between the client and the server via the HTTP proxy server.

2. The method of claim 1 further comprising:
   sending data from the server to the client over the first quasi-persistent HTTP connection, wherein the data can be sent from the server to the client without having to generate a new HTTP request.

3. The method of claim 1 further comprising:

receiving data from the client over the second quasi-persistent HTTP connection, wherein the data can be sent from the server to the client without having to generate a new HTTP request.

4. The method of claim 1 further comprising:

sending heartbeat data to the client over the first quasi-persistent HTTP connection.

5. The method of claim 1 further comprising:

receiving heartbeat data from the client over the second quasi-persistent HTTP connection.

6. The method of claim 1 wherein the first content-length value is at least 256 Kbytes.

7. The method of claim 1 wherein the second content-length value is at least 256 Kbytes.

* * * * *